US008619416B2

(12) United States Patent
Lim

(10) Patent No.: US 8,619,416 B2
(45) Date of Patent: Dec. 31, 2013

(54) DUAL-ORIENTATION DOCKING APPARATUS

(75) Inventor: Hui Leng Lim, Sugar Land, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 65 days.

(21) Appl. No.: 13/270,301

(22) Filed: Oct. 11, 2011

(65) Prior Publication Data

US 2013/0088830 A1     Apr. 11, 2013

(51) Int. Cl.
*G06F 1/16* (2006.01)

(52) U.S. Cl.
CPC .................................... *G06F 1/1632* (2013.01)
USPC ................... 361/679.41; 361/679.55

(58) Field of Classification Search
USPC ............................ 361/679.26–679.3, 679.41, 361/679.55–679.58
See application file for complete search history.

(56) References Cited

U.S. PATENT DOCUMENTS

| | | | |
|---|---|---|---|
| 5,544,010 A * | 8/1996 | Schultz et al. | 361/679.41 |
| 7,708,240 B2 * | 5/2010 | Homer et al. | 248/130 |
| 7,719,830 B2 * | 5/2010 | Howarth et al. | 361/679.41 |
| 7,839,118 B2 | 11/2010 | Carnevali | |
| 7,916,467 B2 | 3/2011 | Hotelling et al. | |
| 7,969,732 B1 * | 6/2011 | Noble | 361/679.56 |
| 7,997,507 B2 * | 8/2011 | Lin et al. | 238/371 |
| D650,783 S * | 12/2011 | Ausfeld et al. | D14/434 |
| 8,230,992 B2 * | 7/2012 | Law et al. | 206/320 |
| 2003/0222848 A1 * | 12/2003 | Solomon et al. | 345/156 |
| 2003/0227746 A1 * | 12/2003 | Sato | 361/686 |
| 2004/0257753 A1 * | 12/2004 | Rossini | 361/681 |
| 2005/0213297 A1 * | 9/2005 | Ulla et al. | 361/683 |
| 2011/0031287 A1 * | 2/2011 | Le Gette et al. | 224/101 |
| 2011/0065314 A1 | 3/2011 | Vroom et al. | |
| 2011/0075349 A1 | 3/2011 | Ma et al. | |
| 2011/0167187 A1 | 7/2011 | Crumlin et al. | |
| 2011/0240448 A1 * | 10/2011 | Springer et al. | 200/331 |
| 2011/0283868 A1 * | 11/2011 | Behringer et al. | 84/622 |
| 2011/0299238 A1 * | 12/2011 | Radin et al. | 361/679.41 |
| 2012/0037771 A1 * | 2/2012 | Kitchen | 248/223.41 |
| 2012/0062479 A1 * | 3/2012 | Feldstein et al. | 345/173 |
| 2012/0068832 A1 * | 3/2012 | Feldstein et al. | 340/12.5 |
| 2012/0182675 A1 * | 7/2012 | Zhou | 361/679.01 |
| 2012/0293924 A1 * | 11/2012 | Dolci et al. | 361/679.01 |

FOREIGN PATENT DOCUMENTS

CN           101458545 A       7/2009

* cited by examiner

*Primary Examiner* — Adrian S Wilson
(74) *Attorney, Agent, or Firm* — Romiwa C. Akpala

(57) ABSTRACT

Embodiments of the present invention disclose a dual-orientation docking apparatus for a mobile computing device. According to one embodiment, the docking apparatus includes a main body having a first side and a second side perpendicular to the first side. A docking connector is disposed on the first side of the main body, and a locking member formed on the second side of the main body. Furthermore, the locking member is configured to automatically engage and maintain a mobile computing device in a docked state when the mobile device is moved from a first orientation to a second orientation.

17 Claims, 4 Drawing Sheets

DUAL-ORIENTATION DOCKING APPARATUS

BACKGROUND

The emergence and popularity of mobile computing has made portable electronic devices—due to their compact design and light weight—a staple in today's marketplace. Mobile devices such as tablet personal computers and smartphones involve advance computing functionality and are utilized for common tasks including email, internet surfing, gaming, and media capture/playback. However, excessive multi-tasking leads to prolonged operation, which can drastically reduce the battery life of the mobile device and sometimes requires the user to alter the orientation of the device (e.g., landscape to portrait and vice versa) for optimum viewing of content. Docking stations provide a convenient means of charging the mobile device during operation, but viewing adjustment of the mobile device while in a docked position remains problematic.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

Figure 1:
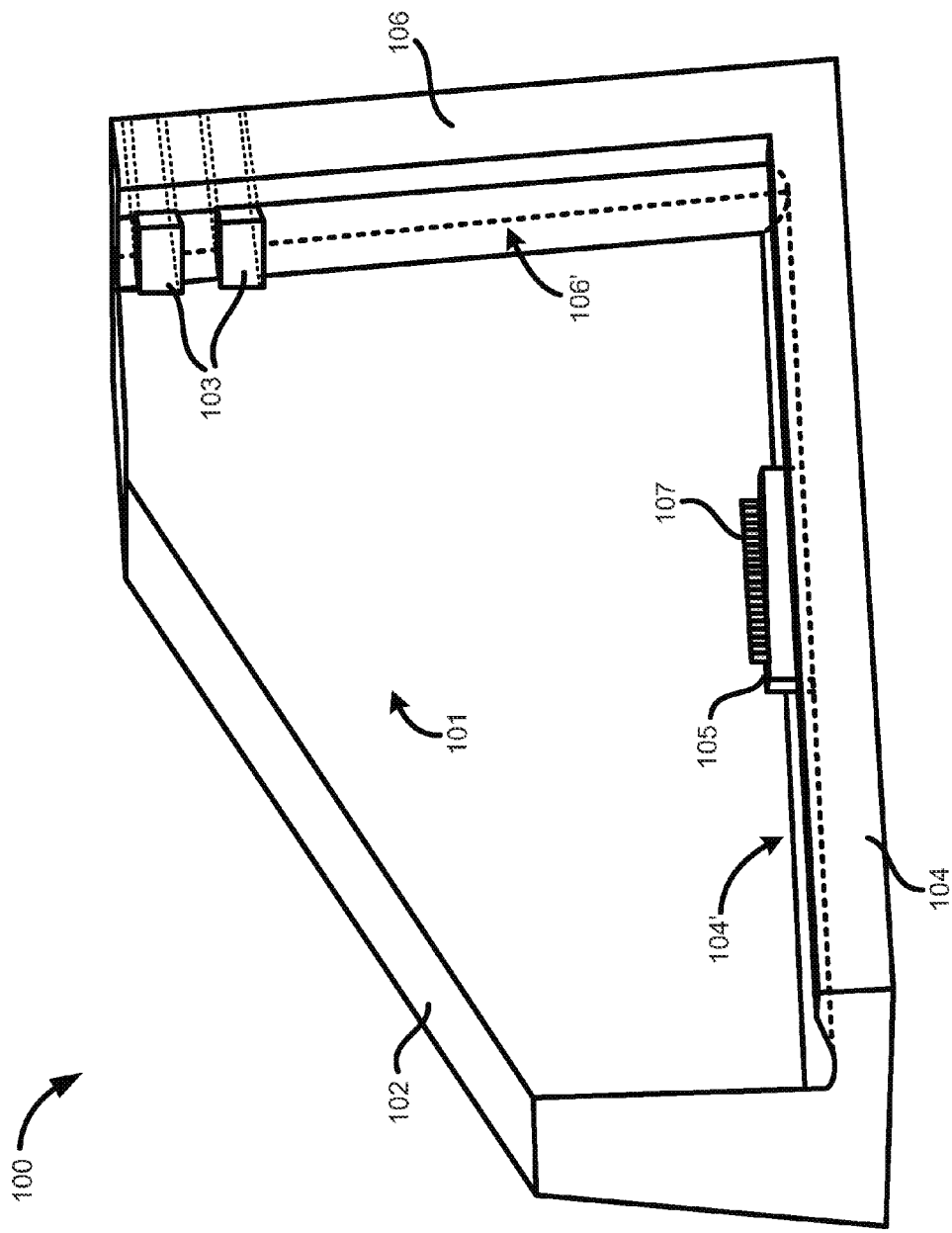
FIG. 1 is a three-dimensional perspective view of a dual-orientation docking apparatus for a mobile device in accordance with an embodiment of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Generally, prior docking stations only allow for one primary viewing orientation, either landscape or portrait. Some docking stations allow for multiple viewing orientations, but they typically involve a large hinge and arm design. In such configurations, the docking station includes a holder element attached to the end of an arm member and hinge for mounting onto the mobile device (e.g., tablet PC). The hinge allows the holder element and the tablet to be rotated in landscape or portrait orientation. However, the hinge, which is typically made of metallic material, is bulky and heavy as it needs to support the weight of both the tablet and the holder element. The cumbersome design limits the portability of the docking station and also consumes a large operating space. Furthermore, the holder element requires manual rotation and articulation in order to grip the tablet firmly on all sides thereof. Moreover, in order to accommodate varying sized tablet systems, prior designs utilize sliding arm mechanisms formed within the holder, which is unintuitive and requires the user to manually slide each arm over the tablet in order to accommodate the exact dimensions of the tablet.

Examples of the present invention disclose a self-locking and dual-orientation docking station for mobile computing devices. According to one example, the disclosed configuration allows for a mobile computing device to remain docked when switching viewing orientations between landscape and portrait. More particularly, a docking connector is disposed along a lower side of the docking station so as to provide a docking or mounting platform for the mobile device in a primary viewing orientation. When the mobile device is repositioned into a secondary viewing orientation, a self-locking mechanism is engaged to ensure the dock connector of the docking station remains engaged with the mobile device.

Referring now in more detail to the drawings in which like numerals identify corresponding parts throughout the views, FIG. 1 is a three-dimensional perspective view of a dual-orientation docking apparatus for a mobile device in accordance with an embodiment of the present invention. As shown here, the docking apparatus 100 includes a main body 101 having a lower docking side 104 and locking side 106 perpendicular to the docking side 104. The docking side 104 includes a docking connector 105 disposed within an inner area 104' thereof. According to one example, the docking connector 105 includes electrical contacts 106 for establishing electrical communication with mobile computing device via a connector port thereof. In another example, the docking connector 106 does not include electrical contacts and simply serves as a support member or stand structure for receiving the mobile device (i.e., dock stand). Additionally, the main body 101 includes a slanted side 102 formed opposite the docking side 104 so as to allow easy removal of the mobile device from the docked position. Still further, locking side 106 includes an inner guide or groove area 106' for engaging with a shortened side of the mobile computing device as will be described in further detail with respect to FIGS. 2A and 2B. Furthermore, the locking side 106 includes locking members 103 formed near an upper side thereof. As will described in further detail below, the locking members 103 include an elastic element and are utilized for maintaining a mobile device in a connected and fixed docking position during transition from landscape orientation to a portrait orientation.

Figure 2B:
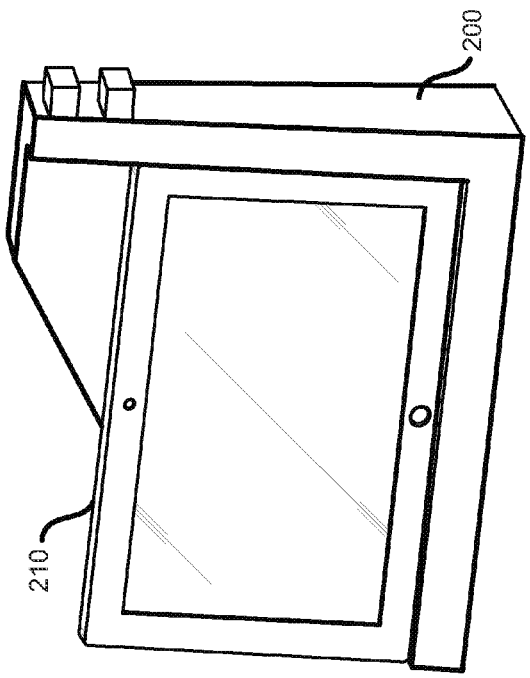
FIGS. 2A and 2B are three-dimensional perspective views of a mobile computing device being docked within the dual-orientation docking apparatus according to an example of the present invention.
Figure 2A:
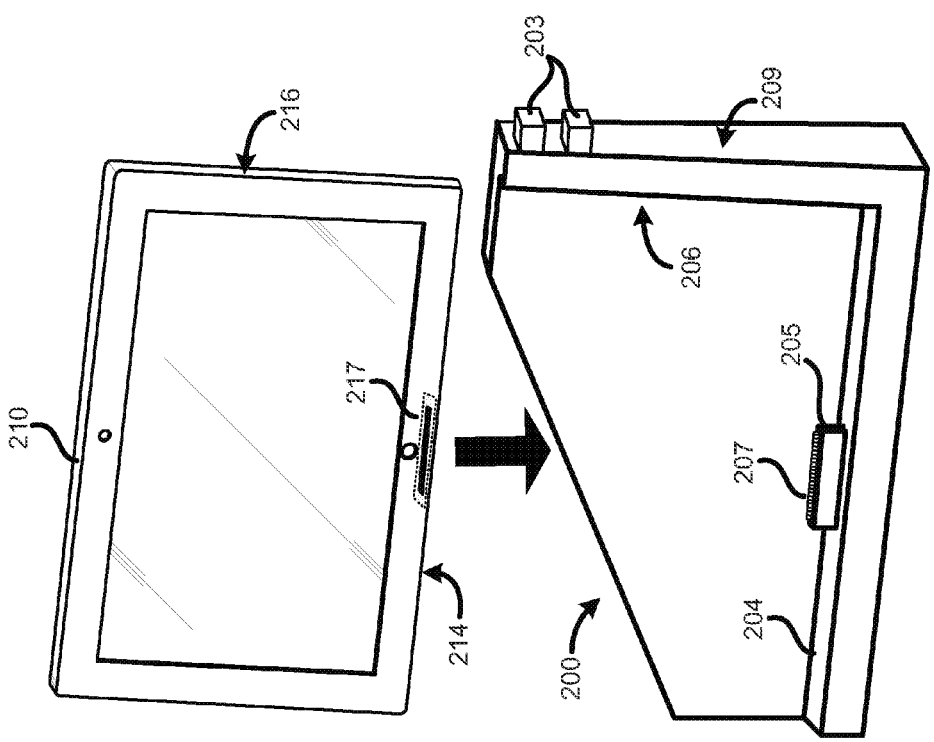

FIGS. 2A and 2B are three-dimensional perspective views of a mobile computing device being docked within a dual-orientation docking apparatus according to an example of the present invention. As shown in FIG. 2A, a mobile computing device such as a tablet personal computer for example, is placed into a docking apparatus 200. The mobile computing device 210 includes a connection port 217 formed on a connection side 214. The connection port 217 includes electrical contacts configured to mate with the electrical contacts 207 of the docking connector 205. According to one example, when in a docked position (FIG. 2B), the connection port 217 of the mobile computing device 210 is inserted into the docking connector 205 for establishing electrical communication via the electrical contacts 207. Moreover, a guiding side 216 of the mobile device is the side perpendicular to the connection side 214 and engages with the locking side 206 of the docking station 200 when in the docked position. Here, the mobile computing device 210 and docking apparatus 200 are in a landscape orientation, in which both the docking side 204 of the docking station 200 and the connecting side 214 of the mobile computing device 210 are positioned parallel to the normal or operating surface. While in the landscape orientation, locking members 203 are in an open position and extend from the bottom area 209 (opposite the guide area) of the locking side 206 in order to allow for the guide side 216 of the mobile device 210 to slide along the guide area of the locking side 206 of the docking apparatus 200. FIG. 2B depicts the mobile device 210 in a primary landscape orientation and completely docked, in which the docking connector 207 of the docking apparatus 200 is electronically and physically coupled with the connector port 217 of the mobile device 210. According to one example, the docking side 204/connecting side 214 are longer than the locking side 206/guiding side 216 of the docking apparatus 200 and mobile device 210 respectively. Consequently, landscape orientation, as used herein, may be defined when the longer connecting side 214 of the mobile device 210 is parallel to the normal surface, while portrait orientation may be defined when the longer connecting side 214 of the mobile device 210 is perpendicular to the normal surface.

Figure 3:
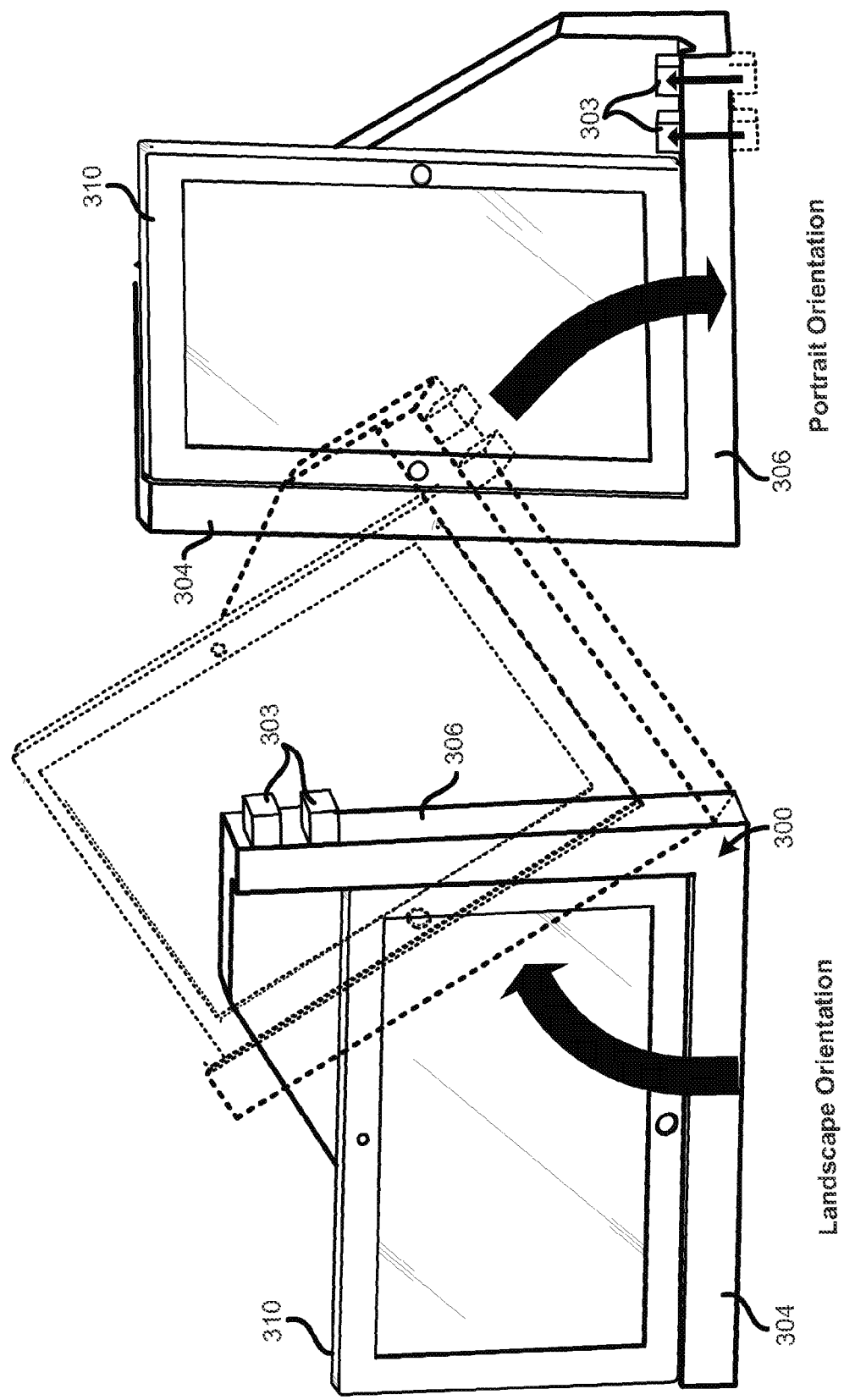
FIG. 3 includes three-dimensional perspective views of the mobile device and docking apparatus being rotated from a first viewing orientation to a second viewing orientation according to an example of the present invention.

FIG. 3 are three-dimensional action views of the mobile device and docking apparatus being rotated from a first viewing orientation to a second viewing orientation according to an example of the present invention. As set forth previously, the primary viewing or landscape orientation involves the operating user sliding the mobile computing device 310 into the docking station 300 and dock connector using the locking side 306 of the dock 300 as a guide and support element. While in the primary viewing orientation, the mobile computing device 310 rests within the cavity area (i.e., locking area and connecting area) of the docking apparatus 300. Accordingly, the weight of the mobile computing device 300 will ensure the dock connector is well-engaged and remains in a connected state with the mobile computing device 310 whilst in the docked position.

Furthermore, the present configuration allows for seamless viewing adjustment when the user desires to view the displayed content in a secondary or portrait orientation. In order to bring the mobile device to this secondary viewing position, the docking apparatus and mobile computing device 310 are lifted and rotated clockwise (e.g., 90° rotation) such that the docking side 304 of the docking apparatus 300 becomes perpendicular to the normal surface, while the locking side 306 of the docking apparatus 300 becomes parallel and in contact with the normal surface as shown in the depiction on the right of FIG. 3 (portrait orientation). Customarily, the dock connector may become disengaged from the mobile device while in this secondary viewing mode. In the present examples, however, a self-locking mechanism activates when the docking apparatus and mobile device are repositioned to the portrait orientation. More specifically, the weight of the docking apparatus 300 and mobile computing device 310 serves to depress the locking members 303 against the normal surface, thus forcing the movable locking members 303 upward and into locked/closed position (as indicated by the upward directional arrows) so that the now side-mounted dock connector cannot be dislodge or disconnected from the mobile device 310. This self-locking mechanism will be described in further detail with respect to FIGS. 4A and 4B.

Figure 4A:
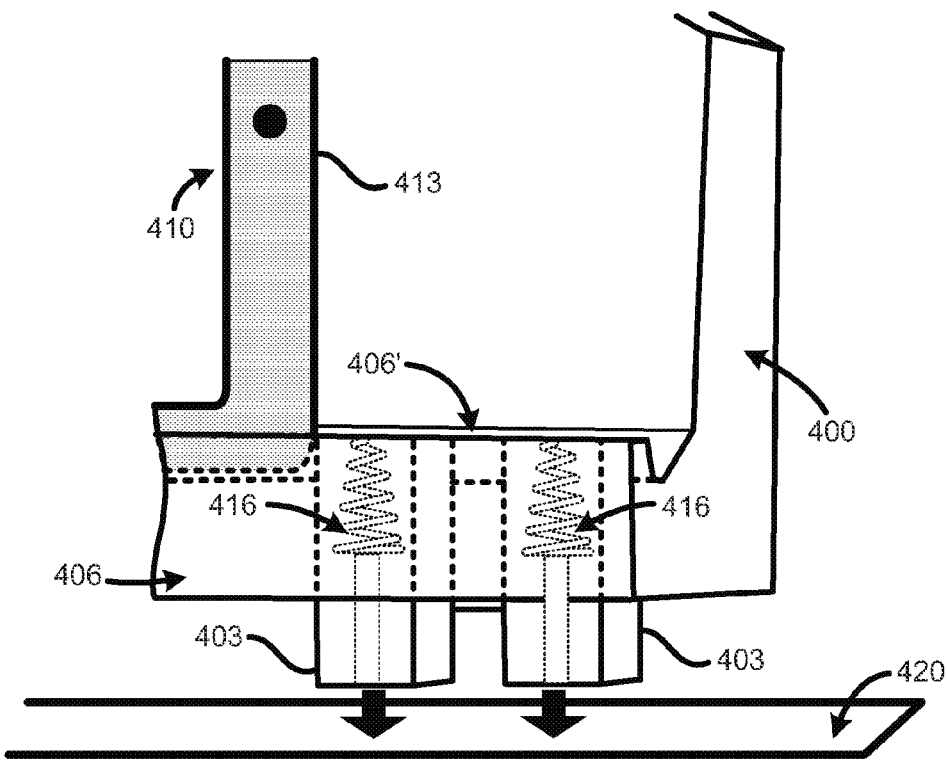
FIGS. 4A and 4B are enlarged views of the locking members automatically adjusting from an unlocked position to a locked position in accordance with an example of the present invention.
Figure 4B:
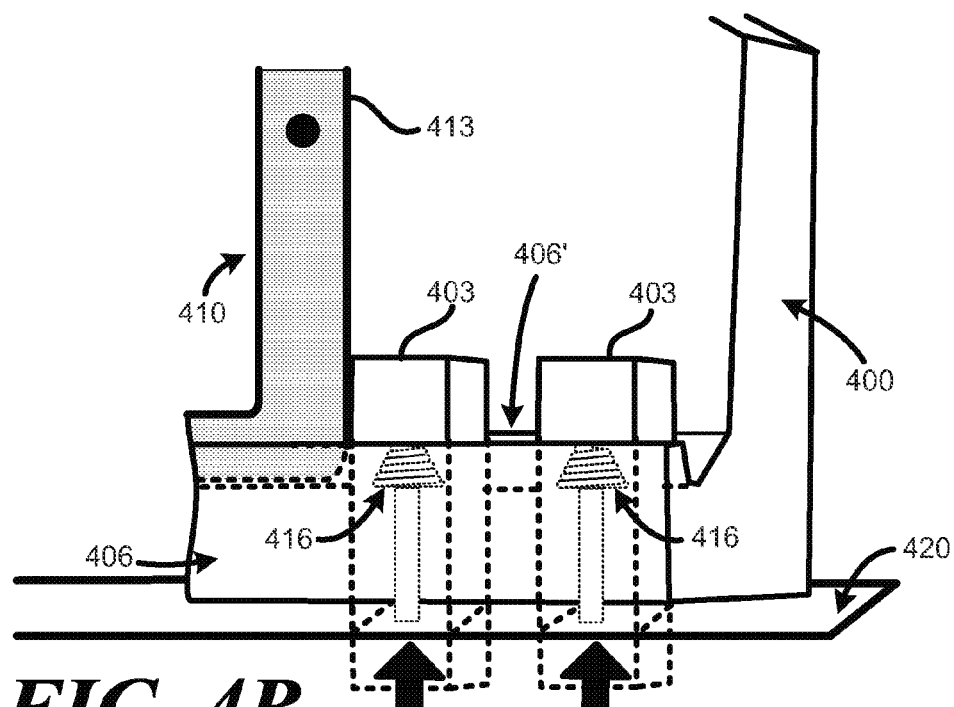

FIGS. 4A and 4B are enlarged views of the locking members automatically adjusting from an unlocked position to a locked position in accordance with an example of the present invention. Here, the mobile computing device 410 and the docking apparatus 400 are in a secondary position or portrait orientation. As shown in the example of FIG. 4A, the locking side 406 of the docking apparatus 400 is parallel to the normal or contact surface 420, with the locking members 403 in an unlocked position and in close contact with the operating surface 420. Moreover, each locking member 403 includes an elastic element (e.g., inner compression spring 416) for facilitating automatic movement of the locking members 403 from an open/unlocked to a closed/locked position. When the locking members 403 are in an open or unlocked position, the inner springs 416 remain in a rested or expanded state as shown in FIG. 4A. Though a compression coil spring is depicted as the elastic element in the present example, the invention is not limited thereto. For example, the elastic element may include a rubber band, a leaf spring, or any similar elastic object configured to store potential energy, or expand and contract based on external force.

FIG. 4B depicts the bottom edge of the apparatus' locking side 408 resting and coming into physical contact with the normal surface 420. As shown here, such action causes the inner springs 416 to contract and force the locking members 403 to extend upwards into the guide area 406' of the locking side 406. The inner springs 416 serve as support elements for maintaining the locking members 403 in the locked position within the guide area 406' of the docking apparatus 400. When in the closed or locked position, the locking members 403 abut an engaging side 413 of the mobile device, which is the side perpendicular to the guide side (216 in FIG. 2A) and opposite the connecting side (214 in FIG. 2A). The force exerted onto the engaging side 413 from the locking member 403 serves to push the opposite connecting side into the docking side of the docking apparatus 400. Accordingly, the mobile device 410 can be reliably maintained in a fixed upright position (i.e., portrait orientation) within the docking apparatus 400 via the self-locking mechanism described above.

Embodiments of the present invention provide a dual-orientation docking apparatus for a mobile computing device. Moreover, several advantages are afforded by the configuration of the present examples. For instance, the self-locking mechanism is intuitive and does not require user intervention via a button, slider, switch, or latch for example. Furthermore, the self-locking mechanism can be easily multiplied on the docking station to allow for varying sized tablets, for example a regular tablet or a wider version when an accessory module is attached to one edge. The present configuration also enables a docking apparatus that can be used as a docking station for powering the device via electrical contacts on the docking connector, or simply as a device stand for providing dual viewing orientation if the docking connector is without electrical contacts.

In addition, the docking station can be designed to allow for different tilt angles of the mobile device within the docking station based on viewing orientation. Still further, multiple locking members may be utilized to accommodate varying sizes of mobile computing devices (e.g., only right-most locking member 403 is used for larger devices). Moreover, the disclosed docking apparatus is able to self-align with the mobile computing device by using its side profile to align and grip the device without the necessity of additional guide alignment components or features. As such, the present configuration provides a lightweight and highly portable docking solution for mobile computing devices.

Furthermore, while the invention has been described with respect to exemplary embodiments, one skilled in the art will recognize that numerous modifications are possible. For example, although exemplary embodiments depict a tablet personal computer as the mobile computing device, the invention is not limited thereto. For example, the mobile computing device may be a netbook, a tablet personal computer, a cell phone, digital audio player, gaming console or any other portable electronic device enabled with connectivity for a portable docking station.

Furthermore, the size and shape of the locking members are not limited to the size and shape described and depicted in the present examples. For instance, the locking members may be cylindrical in shape and inches longer in order to provide additional support along the engaging side of the mobile device. Thus, although the invention has been described with respect to exemplary embodiments, it will be appreciated that the invention is intended to cover all modifications and equivalents within the scope of the following claims.

What is claimed is:

1. A docking apparatus for a mobile device, the apparatus comprising:
   a main body having a first side and a second side perpendicular to the first side;
   a docking connector formed on the first side of the main body,
   at least one locking member formed on the second side of the main body;
   wherein the at least one locking member is configured to automatically engage and maintain the mobile device in a docked state with the docking connector when the mobile computing device is moved from a first orientation to a second orientation,
   wherein the at least one locking member automatically moves from an open position to a locked position due to a weight of the docking apparatus and the mobile computing device when the mobile computing device is moved to the second orientation such that the second side of the main body contacts a supporting surface.

2. The apparatus of claim 1, wherein the docking connector is inserted into a connector port of the mobile device when the mobile device is in the docked position.

3. The apparatus of claim 1, wherein the first orientation is a landscape orientation and the second orientation is a portrait orientation.

4. The apparatus of claim 3, wherein moving from the landscape orientation to the portrait orientation includes rotating the main body and the mobile computing device ninety degrees such that the second side of the docking station contacts an operating surface.

5. The apparatus of claim 4, wherein the at least one locking member includes an elastic element for automatically moving the locking member from the unlocked position to the locked position.

6. A docking apparatus for a mobile device, the apparatus comprising:
   a main body having a first side and a second side perpendicular to the first side;
   a docking connector formed on the first side of the main body,
   at least one locking member formed on the second side of the main body;
   wherein the at least one locking member is configured to automatically engage and maintain the mobile device in a docked state with the docking connector when the mobile computing device is moved from a first orientation to a second orientation.
   wherein when the at least one locking member is in a locked position, the at least one locking member extends from a retracted position in the main body so as to abut a side of the mobile device opposite the side of the connector port such that the docking connector of the main body remains engaged with the connector port of the mobile device.

7. The apparatus of claim 6, wherein the second side of the mobile device includes an inner groove area that engages with a guiding side of the mobile device when the mobile device is in a docked position.

8. The apparatus of claim 6, wherein the second side of the main body includes a plurality of locking members formed thereon.

9. A docking system comprising:
   a mobile computing device including a connection port formed on an elongated side; and
   a docking apparatus configured to provide a mounting platform for the mobile computing device, wherein the docking station includes a dock connector formed on a docking side and at leant one locking element formed on a locking side perpendicular to the docking side,
   wherein the at least one locking member of the docking apparatus is configured to automatically engage and maintain the mobile device in an electronically coupled state in response to the mobile computing device being moved from a first orientation to a second orientation while mounted in the docking station via coupling of the dock connector and connection port.

10. The system of claim 9, wherein the first orientation is a landscape orientation and the second orientation is a portrait orientation.

11. The system of claim 10, wherein moving from landscape orientation to portrait orientation includes rotating the docking apparatus and the mobile computing device ninety degrees such that the second side of the docking station contacts an operating surface.

12. The system of claim 11, wherein the at least one locking member automatically moves from an open position to a closed position when the locking side of the mobile computing device touches the operating surface.

13. The system of claim 12, wherein the at least one locking member includes an elastic element for automatically moving the locking member from the open position to the closed position.

14. The system of claim 13, wherein when the at least one locking member is in a locked position, the at least one locking member abuts a side of the mobile device opposite side of the connector port such that the docking connector of the docking apparatus remains engaged with the connector port of the mobile device.

15. The system of claim 9, wherein the locking side of the mobile device includes an inner guide area that engages with a shortened side of the mobile device when the mobile computing device is in a docked position within the docking apparatus.

16. The system of claim 9, wherein a side opposite the docking side of the docking apparatus is slanted.

17. The system of claim 9, wherein the first side of the docking station is longer than the second side of the docking station.

* * * * *

UNITED STATES PATENT AND TRADEMARK OFFICE
CERTIFICATE OF CORRECTION

PATENT NO.        : 8,619,416 B2                                                    Page 1 of 1
APPLICATION NO.   : 13/270301
DATED             : December 31, 2013
INVENTOR(S)       : Hui Leng Lim It is certified that error appears in the above-identified patent and that said Letters Patent is hereby corrected as shown below:

In the Claims

In column 6, line 18, in Claim 6, delete "orientation." and insert -- orientation, --, therefor.

In column 6, line 40, in Claim 9, delete "leant" and insert -- least --, therefor.

Signed and Sealed this
Twenty-seventh Day of May, 2014

Michelle K. Lee
*Deputy Director of the United States Patent and Trademark Office*